Nov. 29, 1955
E. V. PHILLIPS ET AL
2,725,554
SYSTEM FOR RECORDING DISCONTINUOUS
SIGNALS IN CONTINUOUS SEQUENCE
Filed July 5, 1952
2 Sheets-Sheet 1
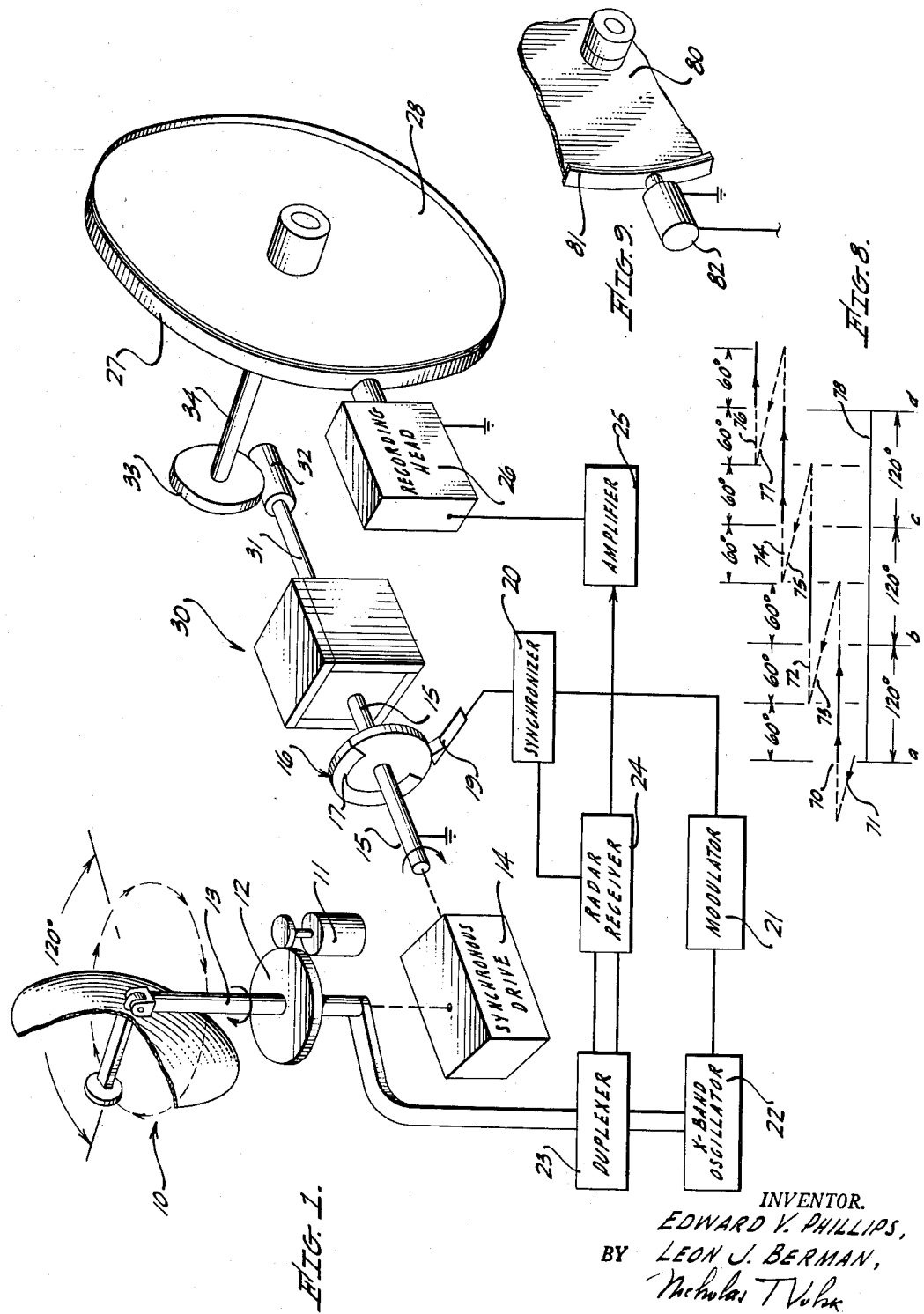
INVENTOR.
EDWARD V. PHILLIPS,
BY LEON J. BERMAN,
Nicholas T Volpe
ATTORNEY.

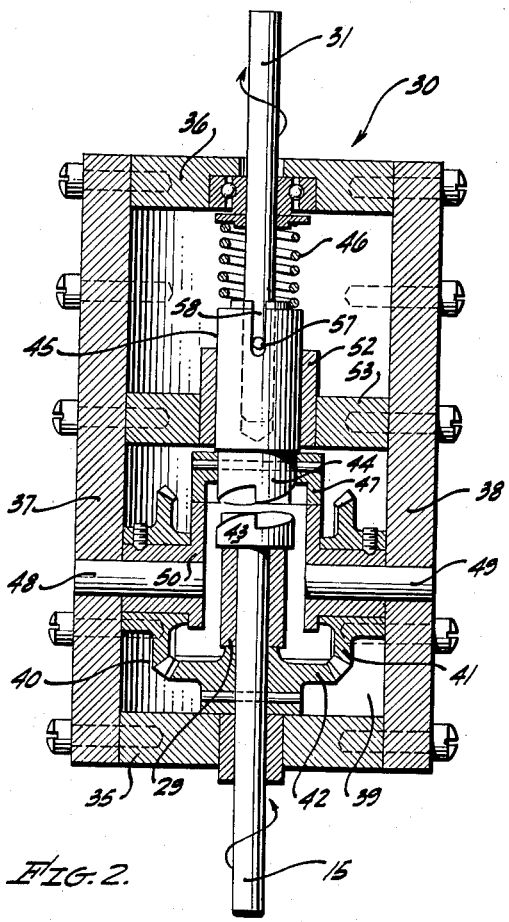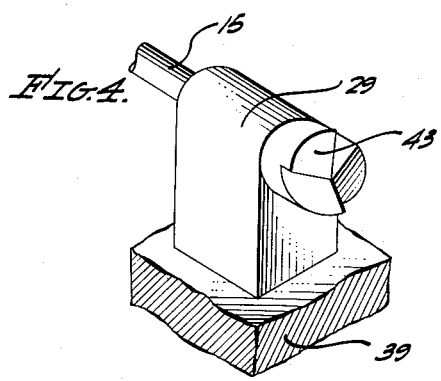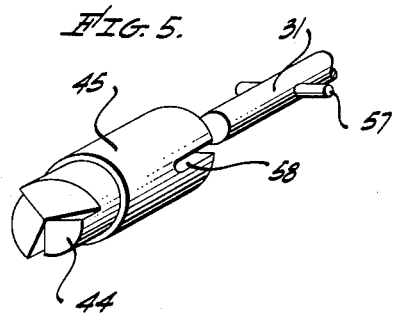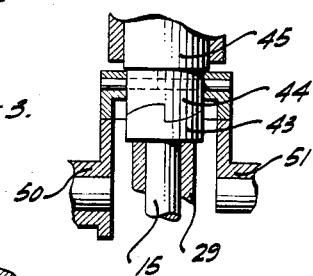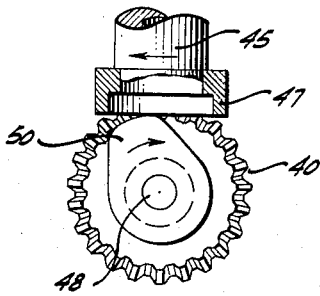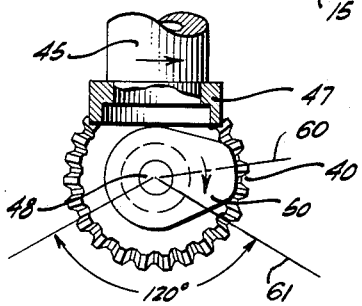

United States Patent Office 2,725,554
Patented Nov. 29, 1955

2,725,554

SYSTEM FOR RECORDING DISCONTINUOUS SIGNALS IN CONTINUOUS SEQUENCE

Edward V. Phillips, Sierra Madre, and Leon J. Berman, Culver City, Calif., assignors, by mesne assignments, to Hughes Aircraft Company, a corporation of Delaware Application July 5, 1952, Serial No. 297,212

15 Claims. (Cl. 343—11)

This invention relates to recording systems, and more particularly to recording systems in which discontinuous electrical signals corresponding to intelligence can be recorded in continuous sequence on light-sensitive film or on other recording media such as magnetic tape. Such a recording system is particularly adaptable for recording signals received during a part of each revolution of a constantly rotating radar antenna.

In producing an accurate record of continuous signals, or where gaps between discontinuous signals are permissible, the drive mechanism for the recording medium is arranged to be driven at a constant velocity. However, where a series of discontinuous signals is recorded in continuous sequence, it is necessary not only to drive the recording medium at constant velocity during each series, but it is also required that each series be joined with the preceding series without a gap. This last requirement makes it necessary that the forward movement of the recording medium be stopped after each series of pulses; then, during the period of signal discontinuance, the movement of the medium should be reversed for a short distance and reestablished as a forward movement before the next series of signals begin in order to insure the proper velocity of the medium as the time signal recording is again initiated. Furthermore, the re-established movement of the recording medium must be accurately timed so that the beginning of each new series is recorded immediately following the last preceding series.

This invention contemplates a signal generating means capable of producing a recurring series of signals generated over one fixed time interval and separated from each other by fixed second time intervals, which generating means is arranged in combination with a recording medium driven in synchronism with the periodically recurring series of signals to produce a record such as would be produced if the signals were continuously generated without the interruptions caused by the second time intervals.

It is, therefore, an object of this invention to provide a system for recording discontinuous signals in a continuous sequence on a recording medium.

It is another object to provide a system for periodically generating a series of signals, combined with means for recording such recurring signals on a recording medium, wherein the actual advance of the recording medium occurs at a uniform velocity concurrently with the generation of each series of signals.

It is an additional object to provide such a system in which the recording means includes a drive mechanism for advancing the recording medium while each series of signals is being generated, and for delaying the advance of the recording medium by reversely moving said medium and re-establishing its forward or advancing movement within the time interval when no signals are generated.

The novel features which are believed to be characteristic of the invention, both as to its organization and method of operation, together with further objects and advantages thereof, will be better understood from the following description considered in connection with the accompanying drawings. It is expressly understood, however, that the drawings are for the purpose of illustration and description only, and are not intended as a definition of the limits of the invention.

Fig. 1 is a schematic illustration of an embodiment of the invention for recording periodically recurring echos of a radar system;

Fig. 2 is a cross-sectional view of the reversing mechanism used in Fig. 1;

Fig. 3 is a fragmentary section of the reversing mechanism illustrated in Fig. 2;

Fig. 4 is an oblique view of the input shaft of the reversing mechanism;

Fig. 5 is an oblique view of the output shaft of the reversing mechanism;

Fig. 6 is an elevation of a gear-driven cam of the reversing mechanism;

Fig. 7, similar to Fig. 6, illustrates the cam in a different angular position;

Fig. 8 is a chart showing the forward and reverse movements of the output shaft of the reversing mechanism; and Fig. 9 is a schematic illustration of a modification of the recording head and recording medium shown in Fig. 1.

Referring now to Fig. 1, there is illustrated a schematic diagram of a signal recording system which for the purpose of description is applied to a radar system wherein an antenna unit 10 is continuously rotated in a scanning orbit by a suitable motor 11 acting through a mechanical gearing 12 which, in turn, is connected to a waveguide shaft 13 supporting the antenna unit.

Scanning by the radar system is accomplished through complete revolutions of antenna unit 10 while activating the system during the same 120° arc of each revolution of the antenna. To achieve this activation accurately, rotation of antenna unit 10 is transmitted to a commutating disc 16 by means of a synchronous drive 14 and a shaft 15. Synchronous drive 14 may be a conventional servo mechanism having a synchro-generator driven by shaft 13 and a synchro-motor for driving shaft 15, or it may be a direct gear drive coupling shaft 13 to shaft 15.

Commutating disc 16 includes a metal portion keyed to shaft 15, and an insulating portion 17 which extends around the circumference of the disc for about 240°. A brush 19 in contact with disc 16 is connected to ground for about 120° of each revolution of the disc through a circuit which includes the metal portion of disc 16, shaft 15, and lead 18. The 120° arc of ground connection is synchronized with the desired 120° arc of antenna rotation referred to above.

A synchronizer 20 contains a blocking oscillator which is energized only during the interval that brush 19 is connected to ground through commutating disc 16. A modulator 21 is energized during this interval which, in turn, applies high energy "keying" pulses to an oscillator 22 which may be a conventional magnetron. The latter generates a high energy microwave exploratory pulse having a duration equal to the applied pulse and the latter is then transmitted over an antenna 10.

The return echoes are conducted to a receiver 24 through duplexer 23. Synchronizer 20 gates receiver 24 "on" during the desired intervals of operation so as to regulate the range and to prevent recording of extraneous noise. The video signal output from receiver 24 is applied to amplifier 25 where it is amplified and then used to modulate a carrier voltage which in turn excites a variable light source contained in a recording head 26 positioned in recording relationship with respect to a light-sensitive film 27 on the rim of wheel 28.

Shaft 15 is synchronously coupled to antenna unit 10, not only for driving disc 16, but also for driving wheel 28 in synchronism with the rotation of the antenna unit.

Shaft 15, receiving its power from synchronous drive 14, operates as the input shaft of a reversing mechanism 30 for supplying power to an output shaft 31. A worm gear 32 transmits power from shaft 31 to wheel 28 by means of a worm wheel 33 and a shaft 34.

Reversing mechanism 30, illustrated in Fig. 2, includes a housing having end plates 35 and 36, side plates 37 and 38, a bottom plate 39, and a cover not shown. Shaft 15, extending through a bearing in end plate 36, is further supported by a bearing block 29 attached to bottom plate 39. Thus, shaft 15 is rigidly and accurately supported for driving a pair of miter gears 40 and 41 by means of a miter gear 42 pinned to shaft 15.

A jaw clutch member 43 formed on the end of input shaft 15 (Fig. 4) normally engages a complementary jaw clutch member 44 formed on the end of a slidable sleeve 45 (Fig. 5) which is urged in a direction toward clutch member 43 by a spring 46. As illustrated in Fig. 2, clutch members 43 and 44 are disengaged from each other by a pair of identical cams 50 and 51 which engage the rim of a collar 47 pinned to sleeve 45. Cams 50 and 51 being adapted for rotation on their respective pins 48 and 49 are driven by their respective gears 40 and 41 because of the driving connections between the hubs of the cams and the bores of the gears.

In addition to being slidable, sleeve 45 is coaxially positioned in the housing with respect to input shaft 15 by a sleeve bearing 52 supported in a cross member 53 attached to side plates 37 and 38. Output shaft 31, extending through end plate 36, is coaxially positioned with respect to sleeve 45 to permit the end of shaft 31 to slide freely within the bore of the sleeve while a driving connection is maintained between them by reason of a cross pin 57 in shaft 31 and diametrically opposite slots 58 which extend axially into the wall of sleeve 45.

As previously stated in connection with Fig. 1, shaft 15 is synchronously coupled to antenna shaft 13; therefore, when antenna unit 10 is rotated, shaft 15 rotates at the same speed, which in turn rotates commutating disc 16 also at the same speed. As shown, disc 16 is timed to activate synchronizer 20 for the same 120° of each revolution of antenna unit 10. During this part of each revolution, the radar system is sending and receiving a series of pulses, the echo signals being impressed on the recording head 26 for modulating a beam of light which is recorded on light-sensitive film 27.

In order to make a record in continuous sequence on film 27 of the signals which periodically occur at recording head 26, means are provided in reversing mechanism 30 for periodically advancing film 27 at uniform velocity during that interval of time when there is the occurrence of the signals. To clarify the description of operation of the invention, values will be assigned to the speeds of rotation of shafts 13 and 15, which in turn will establish the duration of the recurring signals as well as the duration of the intervals between the signals.

For example: assume that waveguide shaft 13 rotates at a velocity of one revolution per second; hence shaft 15 and commutating disc 16 also rotate at one revolution per second. Since, as pointed out above, the signals to be recorded exist for 120° of each revolution of both the waveguide shaft 13 and shaft 15, it follows that the signals exist for 1/3 of a second immediately followed by a lapse of time or a discontinuance of those signals for 2/3 of a second. To record the signals on film 27 in continuous sequence, reversing mechanism 30 rotates output shaft 31 in a clockwise direction for approximately 240°; then the direction of rotation of shaft 31 is automatically reversed for approximately 120° which provides a net clockwise movement of 120° or 1/3 of a revoluiton for each complete clockwise revolution of shafts 13 and 15.

The chart in Fig. 8 illustrates the exact nature of the clockwise and counter-clockwise rotations of shaft 31. The horizontal lines 70, 72, 74, and 76 indicate the clockwise rotation of shaft 31, and the sloping lines 71, 73, 75, and 77 indicate the counter-clockwise rotation of output shaft 31. To further indicate that portion of each clockwise movement of shaft 31 during which the signals exist and their recordings are made, portions of lines 70, 72, and 74 are made solid. The solid portion of line 70 begins at vertical line $a$ and extends for 120° to vertical line $b$; while the solid portion of line 72 begins at vertical line $b$ and extends for 120° to vertical line $c$; and similarly the solid portion of line 74 begins at vertical line $c$ and extends for 120° to vertical line $d$. Attention is directed to the fact that, in addition to extending for 120°, the solid portion of each of the lines 70, 72, and 73 begins where the solid portion of the previous line ends.

The clockwise and counterclockwise movement of output shaft 31 is achieved by the reversing mechanism 30 illustrated in Fig. 2 in which the input shaft 15, being rotated synchronously with antenna shaft 13, is directly connected to output shaft 31 for at least 120° of each revolution of the input shaft by a jaw clutch, Fig. 3, including jaw clutch members 43 and 44, Figs. 4 and 5, each clutch member having three equally spaced clutch teeth radially disposed as shown.

The rotation of input shaft 15 also rotates miter gear 42 which in turn rotates miter gear 40 with its cam 50 and miter gear 41 with its cam 51. The cams 50 and 51 operate to disengage automatically jaw clutch members 43 and 44, and to reverse the direction of rotation of output shaft 31, as indicated in the chart shown in Fig. 8. This clutch disengagement, and the reversal of rotation, is performed once for each revolution of shaft 15, because gears 40 and 41 are driven at the same angular velocity as gear 42.

Figs. 6 and 7 illustrate the operation of cam 50 and is typical of both cams. In Fig. 6, cam 50 is rotating in a clockwise direction, and the rim of collar 47 is riding the lobe of the cam also shown in section in Fig. 2. In this position, both cams 50 and 51 have disengaged jaw clutch members 43 and 44; hence the frictional engagement between the rim of collar 47 and the lobes of cams 50 and 51 will cause the collar, sleeve 45, and shaft 31 to rotate counter-clockwise. In Fig. 7, cam 50 has completed its operation and jaw clutch members 43 and 44 are reengaged as in Fig. 3 under the influence of spring 46. When the radial center of the lobe of cam 50, indicated by line 60, reaches the radial line 61, shaft 31 is rotating clockwise at a synchronous velocity with respect to shaft 15. This rotation continues for 120° and corresponds to the solid portions of line 70, 72, and 74 of Fig. 8.

Although Fig. 8 indicates the clockwise and counterclockwise rotations of shaft 31, the chart is equally applicable to the type of movement imparted to wheel 28 by worm gear 32 on the end of shaft 31, worm wheel 33, and shaft 34. The worm gear and wheel operate to reduce the angular movement of wheel 28 to a small fraction of the angular movement of shaft 31. This permits the record of each series of signals to be confined to a small portion of film 27.

Lines 76, 74, 72, and 70 are representative of the forward movements imparted to film 27; while lines 77, 75, 73, and 71 are representative of the backward movements imparted to the film with respect to the clockwise movement of input shaft 15. The solid portions of lines 76, 74, 72, and 70 indicate the portions of the forward movements of film 27 during which the signals occur and are recorded.

In order to further clarify the manner in which signals are continuously recorded on film 27, a length of film, represented by line 78 Fig. 8, extending from vertical line $a$ to vertical line $d$ is placed in recording relationship with recording head 26. Now, if recording head 26 is moved to the right over line 70 and back to the left as indicated by line 73, then to the right and left as indicated by lines 72 and 75, and again to the right as indicated by line 74; and if during each movement to the right a series of signals is recorded on the length of the film between the vertical lines a and b, b and c, and c and d the resultant recording will be a continuous record of the periodically recurring signals. Obviously, reversing the moving parts does not alter the resultant record; therefore, the record produced in the manner just described is exactly the same as the record produced by the system illustrated in Fig. 1 wherein the film moves and the recording head remains stationary.

Fig. 9 schematically illustrates a modification of the recording elements shown in Fig. 1 in which a wheel 80, driven by shaft 34, includes a rim 81 constructed of magnetizable material. A magnetic recording head 82, positioned in recording relationship with respect to rim 81, is activated by amplifier 25 in the same manner as previously described for recording head 26.

Although the recording mechanism is illustrated in combination with a radar system suitable for periodically radiating signals and receiving echoes therefrom, which echoes are recorded in continuous sequence on a recording medium, the recording mechanism itself is adaptable for making a continuous record of discontinuous signals produced by other systems where a recurrent cycle is present.

What is claimed as new is:

1. A signal recording system comprising: a source of discontinuous signals; a recording medium; a recording head in recording relationship with respect to said recording medium; means for energizing said recording head in synchronism with said discontinuous signals; and drive means coupled to said source for advancing said recording medium in synchronism with the occurrence of the discontinuous signals such that said signals are recorded on the recording medium in continuity by the recording head, said drive means including a clutch normally engaged for transmitting advancing motion to said recording medium, and means adapted for disengaging said clutch and causing the recording medium to move backwardly during the discontinuance of the signals, and for permitting reengagement of said clutch to effect reestablishment of the advancing movement of the recording medium before the next occurrence of the signals.

2. A signal recording system comprising: a source of discontinuous signals, said source including an antenna adapted for rotation at uniform velocity, and means for generating said signals during a predetermined portion of each revolution of said antenna; a recording medium; a recording head in recording relationship with respect to said record-medium; means for energizing said recording head in synchronism with the generation of said signals; and drive means coupled to said antenna for advancing said recording medium in synchronism with the occurrence of the discontinuous signals such that said signals are recorded on the recording medium in continuity by the recording head, said drive means including a clutch normally engaged for transmitting advancing motion to said recording medium, and means for disengaging said clutch and momentarily reversing the advancing movement of the recording medium during the discontinuance of the signals, and for permitting reengagement of said clutch to effect reestablishment of the advancing movement of the recording medium before the next occurrence of the signals.

3. A signal recording system comprising: a source of a periodically recurring series of signals, said source including a rotatable antenna, means for rotating said antenna, and means for generating said series of signals during a predetermined portion of each revolution of said antenna; a recording medium; a rotatable member for driving said recording medium; a recording head in recording relationship with respect to said recording medium; means for energizing said recording head in synchronism with the generation of said series of signals; and drive means coupled between said antenna and said rotatable member for periodically advancing said recording medium during the occurrence of said series of signals, said drive means including clutch coupled input and output shafts for advancing said recording medium in synchronism with the rotation of said predetermined portion of each revolution of said antenna, said drive means also including gear-driven means for uncoupling said input and output shafts and momentarily reversing the rotation of said output shaft with respect to the rotation of said input shaft after the occurrence of each series of signals and for recoupling said input and output shafts before recurrence of the next series of signals; said drive means operating to permit the recording of said periodically recurring series of signals in continuity by omitting the time periods between each series of signals from the record.

4. The combination defined in claim 3 in which said recording medium is a light-sensitive film; and said recording head includes a light source capable of modulation by said periodically recurring series of signals.

5. The combination defined in claim 3 in which said recording medium is a magnetic recording medium; and said recording head is a magnetic recording head.

6. A signal recording system comprising: a source of a periodically recurring series of signals, said source including means for generating said series of signals; and means for recording said periodically recurring series of signals in continuity, said recording means including a recording medium, a rotatable member for driving said recording medium, a recording head in recording relationship with respect to said recording medium, means for energizing said recording head in synchronism with the generation of said series of signals, and drive means for driving said rotatable member for periodically advancing said recording medium during the occurrence of said series of signals, said drive means including an input shaft, means for continuously driving said input shaft in synchronism with the generation of said series of signals, an output shaft coupled to said rotatable member, a normally engaged jaw clutch between said input and output shafts for transmitting movement from said input shaft to said output shaft, a reversing mechanism driven by said input shaft for disengaging said jaw clutch and for thereupon reversely rotating said output shaft with respect to said input shaft after the occurrence of each series of signals and for reengaging said jaw clutch before the next recurrence of said series of signals.

7. The combination defined in claim 6 in which said reversing mechanism includes a gear-driven cam for disengaging said jaw clutch.

8. The combination defined in claim 7 in which said output shaft includes a friction drive member in driving contact with said gear-driven cam for reversely rotating said output shaft with respect to said input shaft when said jaw clutch is disengaged.

9. A signal recording system comprising: motor-driven means for generating a recurring series of signals in a fixed first period of time, each series being periodically spaced from the last preceding series by a fixed second period of time; a recording medium; a recording head coupled to said signal generating means and positioned in recording relationship with respect to said recording medium; and a drive mechanism synchronously interconnecting said signal generating means and said recording medium for advancing said recording medium concurrently with the generation of the recurring series of signals in the first periods of time and for delaying the advance of said medium during the second periods of time, whereby the second periods of time are caused to be omitted from the record produced on the recording medium, and whereby the recurring series of signals are caused to be recorded in continuity on said recording medium, said drive mechanism comprising an input shaft drivenly coupled to the motor of said motor-driven signal generating means, an output shaft drivingly coupled to the recording medium, first and second clutch members fixed, respectively, to said input and output shafts, each of said clutch members having a corresponding plurality of equally spaced mating surfaces engageable in a like plurality of power-transmitting engagements and normally engaged in one of said engagements for transmitting the rotation of said input shaft to said output shaft, and means drivenly connected to said input shaft and operatively coupled to the second clutch member for causing disengagement of the normally engaged mating surfaces of the first and second clutch members after the ending of each first time period and for reversely rotating said second clutch member and the output shaft to cause reengagement of the mating surfaces of the clutch members in another of said power-transmitting engagements before the beginning of the next first time period.

10. The combination defined in claim 9 in which said recording medium comprises a light-sensitive film; and said recording head includes a light source capable of modulation by said periodically recurring series of signals.

11. The combination defined in claim 9 in which said recording medium comprises a magnetizable medium; and said recording head is a magnetic recording head.

12. A signal recording system comprising: first means for periodically generating a series of signals such that each series occurs during a fixed first interval of time and is spaced from the preceding series by a fixed second interval of time, said means including a source of constant angular velocity; second means responsive to said signals, said second means including a recording element; a recording medium movably supported in recording relationship with respect to said recording element; and drive means coupled between the constant angular velocity source and the recording medium for effecting movement of said recording medium in a manner whereby the periodically occurring signals are recorded in continuous sequence, said drive means including a rotatable input shaft coupled to said velocity source, a rotatable output shaft coupled to the movably supported recording medium, a disengageable driving connection interconnecting said input and output shaft for effecting uniform movement of the recording medium in synchronism with the occurrence of each series of signals, and means responsive to rotation of the input shaft for disengaging said driving connection after each series of signals has ended and for causing reengagement of said driving connection before the occurrence of the next succeeding series of signals so as to continue the uniform movement of the recording medium such that succeeding series of signals constitute uninterrupted continuations of each other.

13. A radar system comprising: a signal-transmitting echo-receiving scanning antenna adapted for continuous movement in a scanning orbit; constant velocity motor means drivingly connected to the antenna for continuously moving said antenna in said orbit; radar signal generating means coupled to said antenna; means coupled to said motor means for activating the signal generating means in synchronism with the movement of said antenna throughout a selected portion of the scanning orbit such that a series of radar signals is periodically transmitted for the duration of a selected first interval of time and such that each series is spaced from a preceding series by a selected second interval of time, each first interval of time being equal to the time required for said antenna to move through the selected portion of said orbit and each second interval of time being equal to the time required for said antenna to move through the remainder of said orbit; and means coupled to the signal generating means and the antenna for recording in continuous sequence echoes received by said antenna of the periodically transmitted signals, said recording means including a movable recording medium, a recording head positioned in recording relationship with respect to said recording medium, and a drive mechanism interconnecting the motor means with the recording medium for advancing said medium periodically and in synchronism with the movement of the antenna throughout the selected portion of the scanning orbit such that the echoes received by said antenna are recorded on said medium in continuity.

14. The combination defined in claim 12 in which the drive mechanism of the recording means comprises: a rotatable input shaft coupled to the motor means; a rotatable output shaft coupled to the movable recording medium; a disengageable clutch interconnecting the input and output shafts; and means responsive to rotation of the input shaft for disengaging said clutch after each first interval of time, said means being adapted to reversely rotate the output shaft for causing a receding movement of the recording medium during each second interval of time, and to effect reengagement of said clutch before the next succeeding first interval of time such that advancing movement of the recording medium is established before the next series of signals is transmitted.

15. In a radar system having a signal-transmitting echo-receiving scanning antenna adapted for continuous rotation in a scanning orbit, a constant velocity motor means drivingly connected to the antenna for continuously rotating said antenna in said scanning orbit, a radar signal generating means coupled to said antenna, means responsive to a preselected portion of each revolution of said antenna in the scanning orbit for activating the signal generating means and causing radar signals to be transmitted by said antenna throughout said preselected portion, and means coupled to the signal generating means and the antenna for recording in continuous sequence echoes of said signals as received by said antenna, said recording means comprising: a movable recording medium; a recording head positioned in recording relationship with respect to said recording medium; and a drive mechanism coupled between the scanning antenna and said movable recording medium, whereby said recording medium is caused to advance in synchronism with the preselected portion of each scanning revolution of the antenna, said drive mechanism including an input shaft adapted to rotate in synchronism with the scanning rotation of the antenna, an output shaft connected to the recording medium, a disengageable jaw clutch interconnecting said input and output shafts, and means responsive to rotation of the input shaft and adapted for disengaging said clutch and reversely rotating said output shaft a portion of one revolution with respect to said input shaft such as to cause a backward movement of the recording medium after the antenna has traversed the preselected portion of the scanning revolution, and for effecting reengagement of said clutch before the antenna enters the preselected portion of the next succeeding scanning revolution to provide advancing movement to the recording medium such that the echoes received by the antenna in the preselected portion of said next scanning revolution form a continuation of the echoes recorded in the last preceding scanning revolution of the antenna.

References Cited in the file of this patent

UNITED STATES PATENTS

| | | |
|---|---|---|
| 909,414 | Hytten | Jan. 12, 1909 |
| 2,429,136 | Reinhold | Oct. 14, 1947 |
| 2,485,738 | Jeschke | Oct. 25, 1949 |
| 2,492,120 | Smith | Dec. 20, 1949 |
| 2,590,956 | Gille | Apr. 1, 1952 |